United States Patent [19]

Frushour et al.

[11] 3,843,160

[45] Oct. 22, 1974

[54] CLEVIS HITCH ASSEMBLY

[75] Inventors: George Victor Frushour; Marvin Lee Nafziger, both of Albany, Ga.

[73] Assignee: Lilliston Corporation, Albany, Ga.

[22] Filed: Feb. 12, 1973

[21] Appl. No.: 331,636

[52] U.S. Cl. ............................. 280/415 A, 280/515
[51] Int. Cl. .............................................. B60d 1/02
[58] Field of Search ................ 280/515, 415 A, 417

[56] References Cited
UNITED STATES PATENTS

| | | | |
|---|---|---|---|
| 2,515,991 | 7/1950 | Dufour | 280/515 X |
| 2,531,559 | 11/1950 | Deviley | 280/515 X |
| 3,393,924 | 7/1968 | Silver | 280/515 X |

FOREIGN PATENTS OR APPLICATIONS

| | | | |
|---|---|---|---|
| 590,812 | 7/1947 | Great Britain | 280/515 |

*Primary Examiner*—Leo Friaglia
*Attorney, Agent, or Firm*—Newton, Hopkins & Ormsby

[57] ABSTRACT

A hitch adaptor is connected to a drawbar and displaces the pivotal connection between the drawbar and the tongue of a towed vehicle rearwardly with respect to the drawbar. The adaptor is pin-connected to the drawbar and includes a bumper bar arrangement which bears at widely spaced points against the rear surface of the drawbar to prevent pivotal motion between the adaptor and the drawbar. A clevis pin joins the tongue to the rearward extremity of the adaptor and a latch pin selectively connects the tongue to the adaptor to prevent pivotal motion therebetween. The bumper assembly includes a removable shim plate to adapt the device to a smaller drawbar.

16 Claims, 4 Drawing Figures

CLEVIS HITCH ASSEMBLY

BACKGROUND OF THE INVENTION

In connecting the tongue of a towed vehicle such as a combine and the like to the drawbar of a tractor, the angle through which the tongue may swing when the tractor is turned sharply with respect to the towed vehicle is limited to that angle at which interference between the tongue and drawbar occurs. When making a sharp turn, the drawbar rotation about the hitch pin is limited by the angle throughout which it can turn until coming to bear against the front end of the tongue or a portion of the yoke extension to the tongue. Any attempt to turn sharper than this limitation permitted often results in damage to the tongue or hitch. It would therefore be desirable to displace the pivotal connection between the drawbar and the tongue of the towed vehicle rearwardly with respect to the drawbar to allow sharper turns to be made without damage to the tongue or hitch. However, any such connection must be extremely rugged in construction; it should permit any turn without damage to either the tongue or hitch because of contact with the drawbar; and preferably should be so constructed as allows quick and easy removal thereof from the tractor drawbar.

BRIEF SUMMARY OF THE INVENTION

The present invention is directed to a hitch assembly for connecting the draft tongue of a combine and the like to the drawbar of the tractor wherein the pivotal connection is offset rearwardly from the drawbar. The present invention includes an adaptor which is of very rugged construction and which quickly and easily fits onto the drawbar by means of a conventional connector pin but which is provided with means whereby the adaptor is prevented from any appreciable pivotal motion with respect to the drawbar about the axis of the connector pin. The adaptor connects to the draft tongue through the medium of a clevis pin assembly and means is provided for locking out the pivotal connection at the clevis pin.

BRIEF DESCRIPTION OF THE DRAWING FIGURES

DETAILED DESCRIPTION OF THE INVENTION

Figure 1:
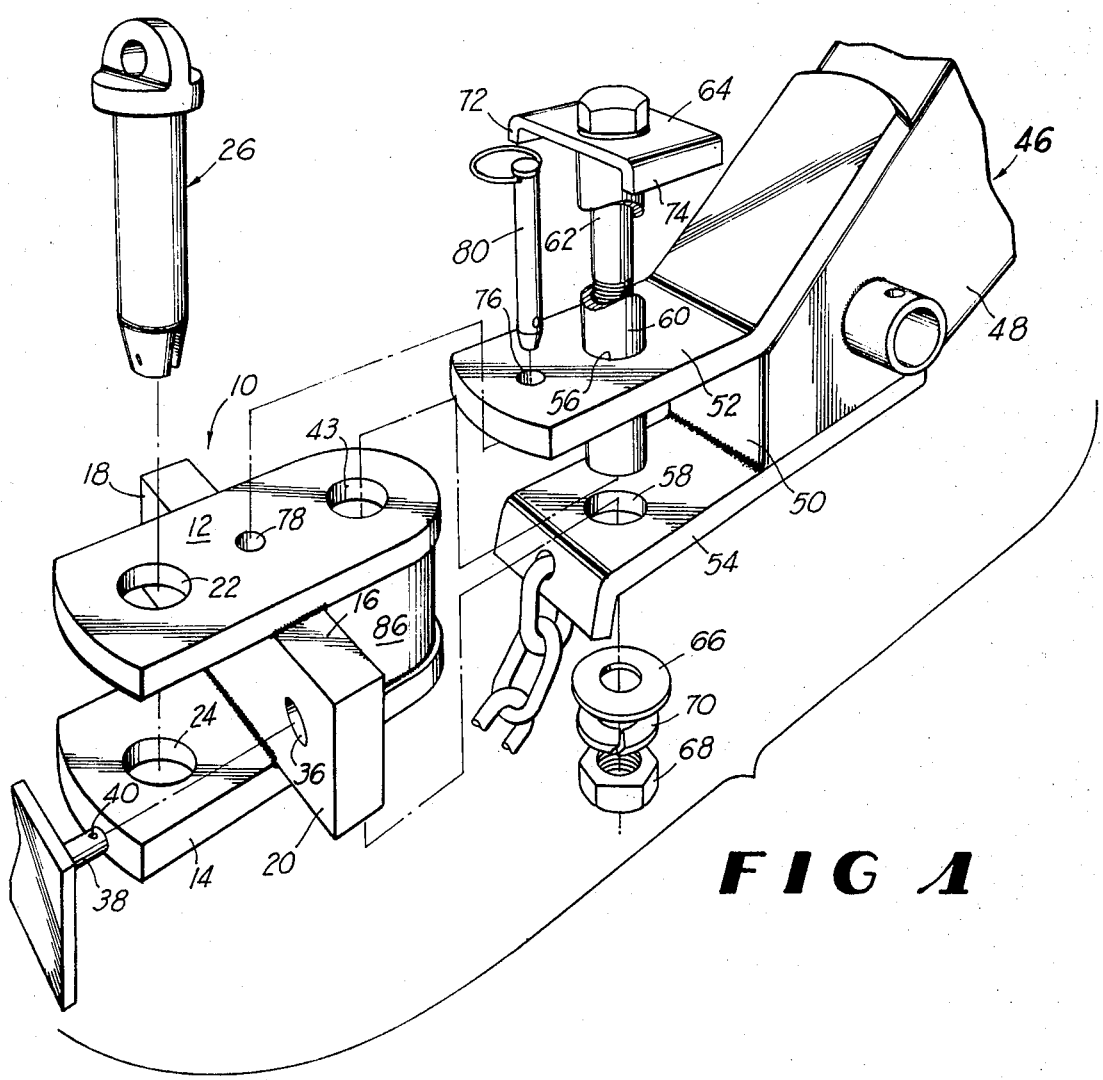
FIG. 1 is a perspective view showing the adaptor and the draft tongue with the component parts in exploded relation.

As illustrated in FIG. 1, the adaptor assembly 10 according to this invention includes an upper hitch plate 12 and a lower hitch plate 14, both of which are elongate and are disposed in vertical alignment. The hitch plates 12 and 14 are joined intermediate their ends by a transversely extending bumper bar 16 the opposite ends of which extend laterally from the hitch plates 12 and 14 a substantial distance as is shown. The bumper bar 16 provides at its opposite ends bumper faces 18 and 20 located laterally beyond the hitch plates, the purpose of which will be presently apparent. In the illustrative embodiment shown, these bumper faces 18 and 20 form part of the single forwardly facing surface of the bumper bar 16 but as will be evident hereinafter, it is the end extremity bumper faces 18 and 20 which are widely spaced which are most important.

Figure 2:
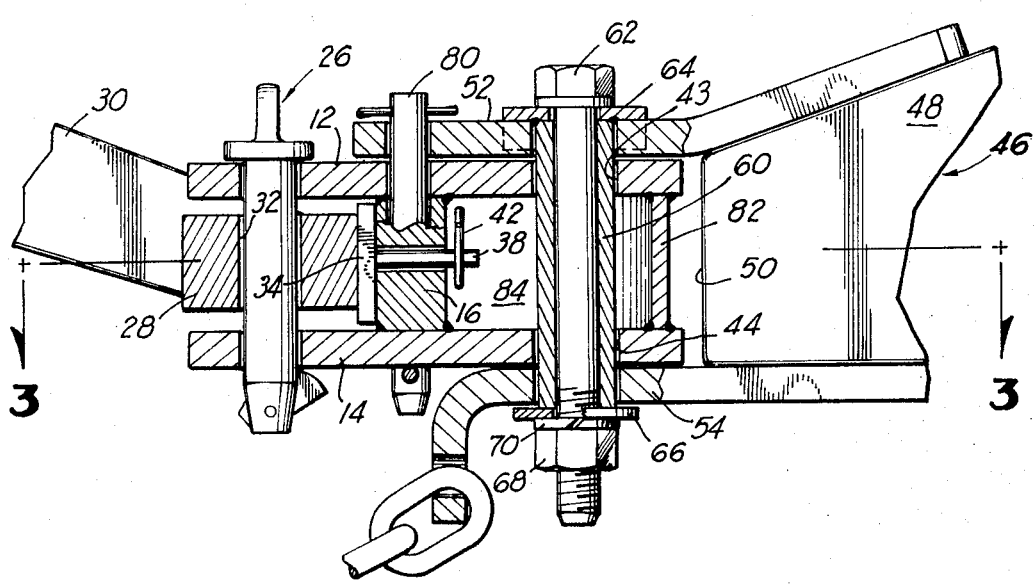
FIG. 2 is a vertical section taken through the assembly shown in FIG. 1 and illustrating also the connection to the drawbar.

The hitch plates 12 and 14 are provided at their forward ends with openings 22 and 24 disposed in vertical registry as illustrated and which are adapted to receive a conventional clevis or connector pin 26. As is shown in FIG. 2, the upper and lower plates 12 and 14 are spaced vertically a sufficient extent to accept the drawbar 28 therebetween, the drawbar forming part of the rigid frame structure of an associated tractor vehicle and being connected thereto as for example by the trailing arm member 30 which, together with its counterpart at the opposite end of the drawbar, rigidly connects the drawbar to the tractor frame. The drawbar, as will be seen, includes at least one vertical opening 32 which is aligned with the openings 22 and 24 in the hitch plates 12 and 14 to receive the pin 26 as previously described whereby to effect a connection between the drawbar and the adaptor 10. The drawbar 28 presents a rear face which is a known distance rearwardly of its opening 32 and in the embodiment shown in FIG. 2, a shim plate 34 is interposed between the rear face of the drawbar 28 and the bumper surfaces or surface of the bumper bar 16. In general, there are two standard sizes of drawbars, the smaller being illustrated in FIG. 2, and the adaptor 10 is so constructed that in the absence of the shim plate 34, the bumper surfaces 18 and 20 are disposed closely adjacent the rear face of the drawbar which is the larger of the two standard sizes. The shim plate 34 is of a thickness to bridge between the bumper surfaces of the bumper bar 16 and the rearward face of the smaller size drawbar 28 illustrated. In this manner, the adaptor is easily and quickly attached to the drawbar while, at the same time, substantially eliminating any pivotal motion between the drawbar and the adaptor about the vertical axis of the connector pin 26. As will be evident, the widely spaced bumper surfaces 18 and 20 serve to effect a triangulation of forces such as strongly resists the aforesaid relative pivotal motion about the axis of the pin 26 without imposing undue stress on the adaptor.

The bumper bar 16 serves also rigidly to interconnect the two hitch plates 12 and 14 as will be evident from FIG. 1 wherein it will be seen that the bumper bar is welded securely to and between the hitch plates 12 and 14. The bumper bar 16 is provided with a pair of openings one of which is indicated by the reference character 36 and the shim plate 34 is provided with forwardly projecting posts 38 having a transverse opening 40 for receiving clip pins 42 as indicated in FIG. 2 when the shim plate is in position and its posts 38 project through the openings in the bumper bar 16.

The rearward ends of the hitch plates 12 and 14 are provided with vertically registered openings, one of which is indicated by the reference character 43 in FIG. 1 and the other of which will be apparent at 44 in FIG. 2.

The draft tongue indicated generally by the reference character 46 includes the main tongue member 48 having a blunt forward nose portion 50 and to which are attached the upper and lower tongue plates 52 and 54 likewise provided with vertically registered openings 56 and 58 which are adapted to be aligned with the openings 43 and 44 in the rearward ends of the hitch plates 12 and 14 as is illustrated in FIG. 2.

A clevis assembly includes a bearing sleeve 60 projecting through the tongue plates 52 and 54 and through the adaptor 10 as illustrated in FIG. 2, the length of this bearing sleeve 60 being such as is slightly greater than the distance between the lower surface of the lower tongue plate 54 and the upper surface of the upper tongue plate 52. The retainer plate 64, which is welded to the upper portion of bearing sleeve 60, is provided with downturned opposite end portions 72 and 74 which engage over opposite sides of the upper tongue plate 52 to prevent the bearing sleeve 60 from rotating in relation to the draft tongue 46. A securing bolt 62 extends through the bearing sleeve 60 and securing nut 68; interposed lock washer 70 bearing against flat washer 66 retains bearing sleeve 60 in position.

The forward extremity of the upper tongue plate 52 is provided with a vertical opening 76 which is adapted to align with the opening 78 which projects through the two hitch plates 12 and 14 and the intervening bumper bar 16 and these openings, when aligned, are adapted to receive the latch pin 80 in the fashion indicated in FIG. 2 whereby to prevent pivotal motion between the adaptor 10 and the tongue assembly 46 when such is desired. Ordinarily, the latch pin 80 is withdrawn to allow pivotal motion between the tongue assembly 46 and the adaptor 10 as established by the clevis connection therebetween as previously described.

Figure 3:
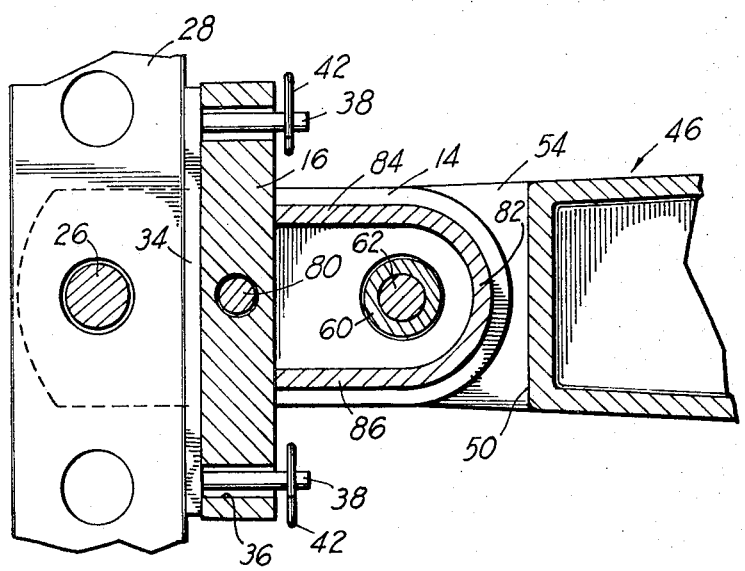
FIG. 3 is a horizontal section taken substantially along the plane of Section line 3—3 in FIG. 2 and showing certain details of construction.

To complete the assemblage, a generally U-shaped connector plate is interposed between the rearward ends of the upper and lower hitch plates as can be best seen in FIG. 3. The bight portion 82 of this connector plate is displaced rearwardly of the clevis assembly and the legs 84 and 86 project forwardly to abut against the rear side of the bumper 16 as is shown and the entire assemblage is rigidly connected to form a reinforcement and connector between the rearward ends of the hitch plates 12 and 14 to cooperate with the rigid interconnection already made by means of the bumper bar 16 such that the entire assemblage is extremely rugged and yet simple in construction.

Figure 4:
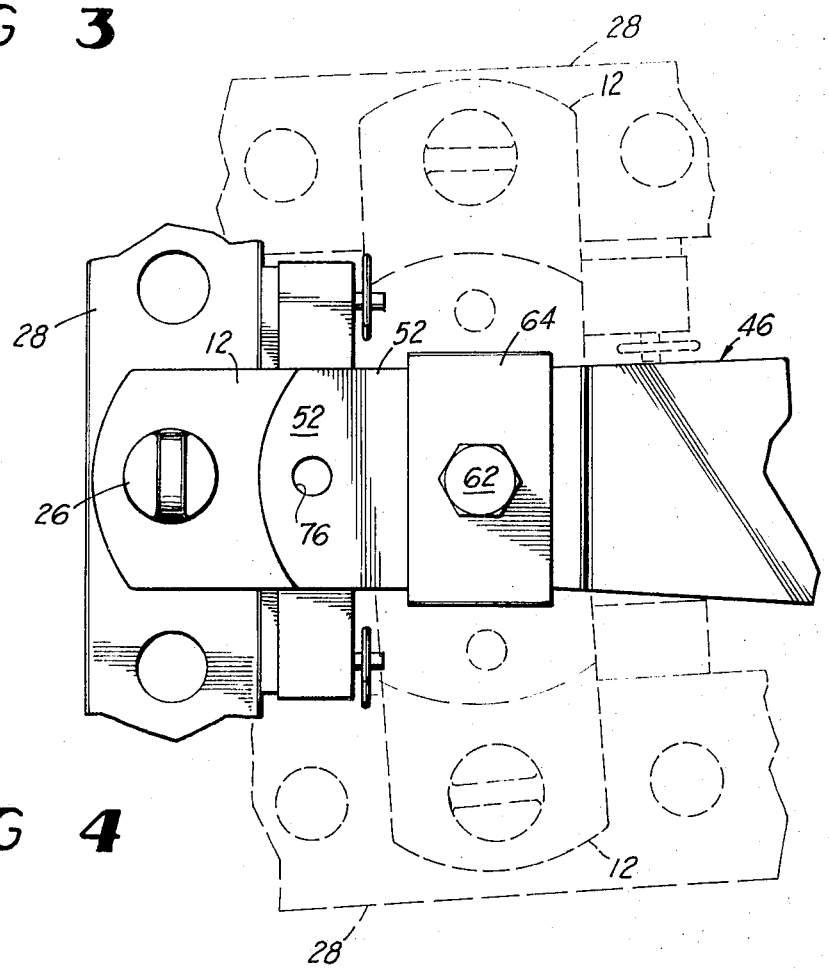
FIG. 4 is a plan view of the assembly as shown in FIG. 3 and illustrating the effect of the rearwardly offset clevis pin axis.

As can be seen in FIG. 4, the rearward displacement of the clevis pin axis allows the drawbar and the tongues to be disposed at very sharp angles without interference, the latch pin 80 of course being removed to permit the clevis assembly to function.

What is claimed is:

1. A hitch adaptor for displacing the pivotal connection between a drawbar of a towing vehicle and the tongue of a towed vehicle rearwardly of such drawbar, comprising in combination:

upper and lower horizontal hitch plates disposed in vertically spaced relation to accept a drawbar between forward ends thereof, said hitch plates having vertically registered openings at said forward ends thereof to align with a drawbar opening and accept a vertical pin connecting the adaptor to a drawbar, said hitch plates also having vertically aligned openings at their rearward ends to align with openings in a tongue of a trailing vehicle and accept a vertical clevis assembly establishing pivotal connection between the hitch adaptor and a tongue of a trailing vehicle, said clevis assembly including a bearing sleeve received in said openings at the rearward ends of the hitch plates and a retainer plate fixed to the upper end of said bearing sleeve, said bearing sleeve being of a length greater than the spacing between the upper surface of said upper hitch plate and the lower surface of said lower hitch plate and said retainer plate having a depending flange for cooperation with a draft tongue to prevent rotation of the bearing sleeve relative to such draft tongue;

an elongate transverse bumper bar between said hitch plates and projecting transversely on opposite sides thereof, said bumper bar being rigidly connected to said hitch plates between the forward and rearward ends thereof and presenting forward bumper faces beyond the opposite sides of said hitch plate which are located a distance behind the openings in the forward ends of said hitch plates which is selected to engage a rear surface of a certain size drawbar and prevent any appreciable pivoting of the adaptor about the vertical pin connecting the adaptor to such drawbar.

2. A hitch adaptor as defined in claim 1 including spacer means for disposition in face-to-face contact with said bumper faces to engage a rear surface of another size drawbar.

3. A hitch adaptor as defined in claim 2 wherein said bumper bar is provided with horizontal fore-and-aft openings at its opposite ends, said spacer means being in the form of a plate having pins projecting through the openings in said bumper bar.

4. A hitch adaptor as defined in claim 1 including a connector plate of generally U-shaped form disposed between said hitch plates rearwardly of said bumper bar, the bight of said connector plate being disposed rearwardly of the openings in the rearward end of said hitch plate and rigidly joining such rearwards ends thereof.

5. A hitch adaptor as defined in claim 4 wherein the free ends of said connector plate extend to and are rigidly secured to the rear side of said bumper bar.

6. A clevis hitch assembly comprising, in combination:

a drawbar having a rear face and an opening extending vertically therethrough at a selected spacing forwardly of said rear face;

a hitch adaptor, said hitch adaptor including upper and lower hitch plates disposed respectively above and below said drawbar and having vertically registered openings aligned with said opening in the drawbar, a connector pin received in all said openings, said hitch plates extending rearwardly of said drawbar and being provided with vertically registered openings remote from said rear face of the drawbar, bumper bar means interposed between and rigidly joining said hitch plates for engaging said rear face of the drawbar to prevent any substantial pivotal motion between said adaptor and said drawbar about said connector pin:

a tongue member having a terminal nose portion, upper and lower tongue plates fixed to said nose portion to overlie and underlie respectively said upper and lower hitch plates, said tongue plates being provided with vertically registered openings aligned with the openings in the rearward ends of said hitch plates, and clevis pin means received in said openings in the tongue plates and the openings in said hitch plates aligned therewith for pivotally joining said tongue member to said adaptor, said clevis pin means including a bearing sleeve of a length to pass completely through said tongue plates and having a retainer plate fixed to the upper end thereof, said retainer plate having a depending flange extending alongside said upper tongue plate to prevent rotation of the bearing sleeve relative to said tongue member.

7. A clevis hitch assembly as defined in claim 6 wherein said bumper bar means includes a removable shim plate.

8. A clevis hitch assembly as defined in claim 7 including a connector plate of generally U-shaped form disposed between said hitch plates rearwardly of said bumper bar means, the bight of said connector plate being disposed rearwardly of the openings in the rearward end of said hitch plate and rigidly joining such rearward ends thereof.

9. A clevis hitch assembly as defined in claim 8 wherein the free ends of said connector plate extend to and are rigidly secured to the rear side of said bumper bar.

10. A clevis hitch assembly as defined in claim 9 wherein the forward end of said upper tongue plate overlies said bumper bar means, the forward end of said upper tongue plate having an opening therein aligned with a latch opening through said adaptor, and a latch pin received in said opening in the forward end of said upper tongue plate and said latch opening whereby to prevent pivotal motion between said tongue member and said adaptor.

11. A clevis hitch assembly comprising, in combination:
  a drawbar having a rear face and an opening extending vertically therethrough at a selected spacing forwardly of said rear face;
  a hitch adaptor, said hitch adaptor including upper and lower hitch plates disposed respectively above and below said drawbar and having vertically registered openings aligned with said openings in the drawbar, a connector pin received in all said openings, said hitch plates extending rearwardly of said drawbar and being provided with vertically registered openings remote from said rear face of the drawbar, bumper bar means interposed between said rigidly joining said hitch plates for engaging said rear face of the drawbar to prevent any substantial pivotal motion between said adaptor and said drawbar about said connector pin;
  a tongue member having a terminal nose portion, upper and lower tongue plates fixed to said nose portion to overlie and underlie respectively said upper and lower hitch plates, said tongue plates being provided with vertically registered openings aligned with the openings in the rearward ends of said hitch plates, and clevis pin means received in said openings in the tongue plates and the openings in said hitch plates aligned therewith for pivotally joining said tongue member to said adaptor, the forward end of said upper tongue plate overlying said bumper bar means, the forward end of said upper tongue plate having an opening therein aligned with a latch opening through said adaptor, and a latch pin received in said opening in the forward end of said upper tongue plate and said latch opening whereby to prevent pivotal motion between said tongue member and said adaptor.

12. A clevis hitch assembly as defined in claim 11 wherein said clevis pin means includes a bearing sleeve and a securing bolt passing therethrough.

13. A clevis hitch assembly comprising, in combination:
  a drawbar having a rear face and an opening extending vertically therethrough at a selected spacing forwardly of said rear face;
  a hitch adaptor, said hitch adaptor including upper and lower hitch plates disposed respectively above and below said drawbar and having vertically registered openings aligned with said opening in the drawbar, a connector pin received in all said openings, said hitch plates extending rearwardly of said drawbar and being provided with vertically registered openings remote from said rear face of the drawbar, bumper bar means interposed between and rigidly joining said hitch plates for engaging said rear face of the drawbar to prevent any substantial pivotal motion between said adaptor and said drawbar about said connector pin;
  a tongue member having a terminal nose portion, upper and lower tongue plates fixed to said nose portion to overlie and under respectively said upper and lower hitch plates, said tongue plates being provided with vertically registered openings aligned with the openings in the rearward ends of said hitch plates, and clevis pin means received in said openings in the tongue plates and the openings in said hitch plates aligned therewith for pivotally joining said tongue member to said adaptor, said clevis pin means including a bearing sleeve and a securing bolt passing therethrough.

14. A clevis hitch assembly as defined in claim 13 wherein said bumper bar means includes a removable shim plate.

15. A clevis hitch assembly as defined in claim 13 including a connector plate of generally U-shaped form disposed between said hitch plates rearwardly of said bumper bar means, the bight of said connector plate being disposed rearwardly of the openings in the rearward end of said hitch plate and rigidly joining such rearward ends thereof.

16. A clevis hitch assembly as defined in claim 15 wherein the free ends of said connector plate extend to and are rigidly secured to the rear side of said bumper bar.

* * * * *